US006538652B2

(12) United States Patent
Kato

(10) Patent No.: US 6,538,652 B2
(45) Date of Patent: *Mar. 25, 2003

(54) MULTI-RESOLUTION GEOMETRY

(76) Inventor: Saul S. Kato, 538 Palomar Dr., Redwood City, CA (US) 94062

( * ) Notice: Subject to any disclaimer, the term of this patent is extended or adjusted under 35 U.S.C. 154(b) by 0 days.

This patent is subject to a terminal disclaimer.

(21) Appl. No.: 10/076,888

(22) Filed: Feb. 15, 2002

(65) Prior Publication Data

US 2002/0075263 A1 Jun. 20, 2002

Related U.S. Application Data

(63) Continuation of application No. 09/243,099, filed on Feb. 2, 1999.
(60) Provisional application No. 60/089,794, filed on Jun. 18, 1998.

(51) Int. Cl.[7] ............................................... G06T 17/20
(52) U.S. Cl. ....................................................... 345/423
(58) Field of Search ............................... 345/423, 419, 345/428, 426, 461

(56) References Cited

U.S. PATENT DOCUMENTS

| | | | | |
|---|---|---|---|---|
| 5,428,717 A | * | 6/1995 | Glassner | 345/423 |
| 5,870,307 A | | 2/1999 | Hull et al. | |
| 5,966,140 A | * | 10/1999 | Popovic et al. | 345/441 |
| 6,262,737 B1 | * | 7/2001 | Li et al. | 345/419 |

OTHER PUBLICATIONS

European Search Report, Jan. 21, 2002, 2 pages.
Paulo Cignoni, Claudio Montani, Enrico Puppo, and Roberto Scopigno, "Multiresolution Representation and Visualization of Volume Data," IEEE Transactions on Visualization and Computer Graphics, vol. 3, No. 4, Oct.–Dec., 1997, pp. 352–369.

S. Wang, R. Takamatsu, M. Sato, H. Kawarada, "Shape Simplification of Free–Form Surface Objects for Multi–Scale Representation," Oct. 14, 1996, pp. 1623–1628.

Peter Lindstrom, David Koller, William Ribarsky, Larry F. Hodges, Nick Faust, and Gregory A. Turner, "Real–Time, Continuous Level of Detail Rendering of Height Fields," Computer Graphics Proceedings, Annual Conference Series, 1996, Aug. 4, 1996, pp. 109–118.

H. Hoppe, T. DeRose, T. Duchamp, J. McDonald, W. Stuetzle, "Mesh Optimization", *Computer Graphics Proceedings, Annual Conference Series, 1993,* Aug. 1–6, 1993, pp. 19–26.

(List continued on next page.)

*Primary Examiner*—Mark Zimmerman
*Assistant Examiner*—Huedung X. Cao
(74) *Attorney, Agent, or Firm*—Fenwick & West, LLP

(57) ABSTRACT

A system, method, and apparatus is disclosed for creating a three-dimensional visual representation of an object having multiple resolutions by retrieving a vertex list for the object, determining a collapse order for the vertices identified in the vertex list, reordering the vertices identified in the vertex list responsive to the determined collapse order, and creating a vertex collapse list responsive to the collapse order, where the vertex collapse list specifies, for a target vertex, a neighbor vertex to collapse to. The vertex list may comprise 3D coordinates of vertices without referring to other vertex attributes or, in alternate embodiments, the vertex list may refer to other vertex attributes such as colors or normals. A runtime manager is disclosed which dynamically manages the polygon counts for objects and frames based upon the location, velocity, and area of the object. Polygon counts are also adjusted based upon a target frame rate and a target polygon count. A system is also disclosed for continuous transfer of data across a remote connection in which different levels of resolution are transmitted individually.

23 Claims, 16 Drawing Sheets

OTHER PUBLICATIONS

M. Garland, P. Heckbert, "Surface Simplification Using Quadric Error Metrics", *Computer Graphics Proceedings, Annual Conference Series, 1997,* Aug. 3–8, 1997, pp. 209–216.

W. Schroeder, J. Zarge, W. Lorensen, "Decimation of Triangle Meshes," *Computer Graphics,* Jul. 26–31, 1992, pp. 65–70.

G. Turk, "Re–Tiling Polygonal Surfaces," *Computer Graphics,* Jul. 26–31, 1992, pp. 55–64.

H. Hoppe, "Progressive Meshes", (printed from http://www.research.microsoft.com/research/graphics/hoppe).

* cited by examiner

MULTI-RESOLUTION GEOMETRY

CROSS-REFERENCE TO RELATED APPLICATIONS

This application is a continuation of U.S. patent application Ser. No. 09/243,099, filed on Feb. 2, 1999, which claims priority under 35 U.S.C. §119(e) from U.S. provisional patent application serial No. 60/089,794, filed on Jun. 18, 1998.

DESCRIPTION OF THE RELATED ART

1. Field of the Invention

This invention relates to the field of generating three-dimensional graphics; more specifically, to the field of generating multiple resolutions of an object in a three-dimensional environment.

2. Background of the Invention

Realistic three-dimensional object rendering for use in games and other software applications has been the goal for software and hardware makers in the computer industry for years. However, numerous problems prevent the achievement of realistic three-dimensional object rendering on a typical user's home computer.

Three-dimensional graphics use polygons to create the object to be rendered. These polygons are created and manipulated to portray curvature and details of the object. The more polygons used to create an object, the more detailed and realistic an object will appear. However, the more polygons used to create an object, the more computations required to render the object, thus slowing down the speed at which the object is rendered. Thus, there is a tradeoff from the developer's standpoint between speed and realism.

The resolution of this problem is not easy. As most users do not have the latest, most powerful personal computer, the developer must design the objects for the lowest common denominator if the developer wants to reach the greatest number of potential users for the product. Thus, the developer must assume the user's processor is slow and is therefore capable of only rendering a small number of triangles per second. Therefore, the developer, when making the tradeoff described above, must favor the speed side of the equation, and design objects with fewer triangles than if faster machines were being used by all users. This solution, however, pleases neither the user with a low-end computer nor the user with the high-end computer. The user with the low-end computer will most likely still have images which are slow and choppy, because the developers are unwilling to completely sacrifice realism, and the user with a high-end computer will have images which appear artificial and robotic because the application is not designed to take advantage of the high-end machine's greater processing power. In fact, on some high-end systems, the application will be too fast to play or interact with because the polygon count is too low.

Another problem facing the developer is the fact that the same object requires more detail when closer to the screen than it requires if it is in the background. When an object is closer to the screen, the angles and straight edges of the polygons comprising the object can be seen more clearly. At this point, more polygons are needed to smooth the angles and continue the realistic rendering of the object. However, the most detailed version of the object cannot always be used to render the object because the application will require too much computing power to quickly and smoothly render images on the screen. In order to achieve smooth 3D animation, the processor must render 3D objects at 20 to 60 frames per second. If too many polygons are used for each object, thus providing the necessary realism for the object when it is close to the screen, then the processor will not be able to achieve the above minimum frame rate required for smooth rendering.

One solution to allow realistic rendering of three-dimensional objects while also limiting the number of polygons on the screen is to use Level of Detail mapping. Level of Detail mapping provides different levels of resolutions of an object based upon the distance of the object to the screen. In order to create the different levels of detail, the developer must create different versions of the object for each level required. Typically, only three or four levels are used because storage of multiple versions of each object to be rendered can consume too much of the user's system resources.

There are several drawbacks to the level of detail methodology. First, this method has a large impact on system resources, as described above. Each object now requires three or four times more storage space than previously required to store each version of the object. Each level requires a separate vertex list as well as a separate data structure. Second, when transitioning from one level to another, an effect known as object popping occurs. The higher detailed version of an object is abruptly rendered as the object moves towards the screen, and "pops" out at the viewer, ruining the 3D immersive qualities of the application. The level of detail method also requires extra authoring of each version of the object, requiring more time from the developer. Level of Detail also does not address the lowest common denominator problem described above. The highest level of detail of each object must be created in consideration of the user with an inefficient computer who will be using the application. Thus, the highest level of detail cannot contain too many polygons or the image will appear slow and choppy on the low-end user's computer. Again, this image will also appear angular and robotic on the high-end user's computer, as it does not take advantage of the high-end computer's greater processing power.

SUMMARY OF THE INVENTION

In accordance with the present invention, an apparatus, system, and method is disclosed for producing realistic rendering of a 3D object while minimizing the use of user system resources and maximizing fidelity without sacrificing speed. The invention produces a continuous level of detail of an object using vertex merging responsive to the location of the object on the screen and other factors, thus eliminating the object popping effect. As the object moves towards the background, and therefore requires less polygons in order to provide a realistic rendering, vertices of the object are merged together in a manner designed to cause the least visual distortion. As the vertices are merged, polygons within the object are eliminated, thus lowering the polygon count of the object continuously as it moves farther and farther away from the screen. As an object moves towards the screen, vertices are added to the object, adding polygons to the object and thus providing a more realistic representation of the object as it grows close to the user and fine details become necessary. Thus, at any given moment, every object on the screen only has as many polygons as is required to provide a realistic rendering of the object. No polygons are being unnecessarily drawn, and thus optimum use is being made of the user's system. No object-popping effects are created as polygons are added or removed from the object on a continual basis based on the object's movement in the 3D environment.

Additionally, the invention requires only one version of the object to be authored and stored on the user's system, thus minimizing the impact on system resources. One vertex list is used which preferably specifies the highest level of detail, and the system in accordance with the present invention is able to then generate the continuous level of detail of the object for display on the screen. Also, the system advantageously increases and decreases the resolution of the objects on the fly. Thus, as only the current level of detail being displayed is stored, minimal use of memory is required. By storing certain minimum information which is determined prior to run-time to guide the resolution changes, the resolution changing is performed at run time at optimal speed. Another benefit of the present invention is its ability to allow a developer to tweak the vertex merging in accordance with the developer's own preferences. Finally, the invention automatically adjusts the amount of polygons in a screen responsive to the capabilities of a user's system, providing an optimal image for every user. In one embodiment, the invention monitors the system to determine the frame rate at which the frames are being rendered, and adjusts the total amount of polygons allowable on the screen at one time accordingly.

Additionally, a target frame rate may be set, which allows the user to specify the speed at which the scenes should be rendered. The present invention then dynamically adjusts the total amount of polygons to ensure the frame rate is maintained. Alternatively, the invention allows a polygon count to be specified, and then ensures that this amount of polygons is always on the screen, regardless of the frame rate.

In a preferred embodiment, a three-dimensional visual representation of an object having multiple resolutions is created by retrieving a vertex list for the object, determining a collapse order for the vertices identified in the vertex list, reordering the vertices identified in the vertex list responsive to the determined collapse order, and creating a vertex collapse list responsive to the collapse order, where the vertex collapse list specifies, for a target vertex, a neighbor vertex to collapse to. The vertex list may comprise 3D coordinates of vertices without referring to other vertex attributes or, in alternate embodiments, the vertex list may refer to other vertex attributes such as colors or normals.

More specifically, in a preferred embodiment, the collapse order of the object is determined by determining an optimal collapse path from the set of collapse paths, computing visual distortion factors for the selected collapse path, determining a collapse value for the selected collapse path, repeating for each path in the set of collapse paths, comparing the collapse values to determine a collapse path causing a least visual distortion to the object, selecting a next vertex to be collapsed, collapsing the object along the selected path, and repeating until a minimum resolution level is attained.

DETAILED DESCRIPTION OF THE PREFERRED EMBODIMENTS

Figure 1A:
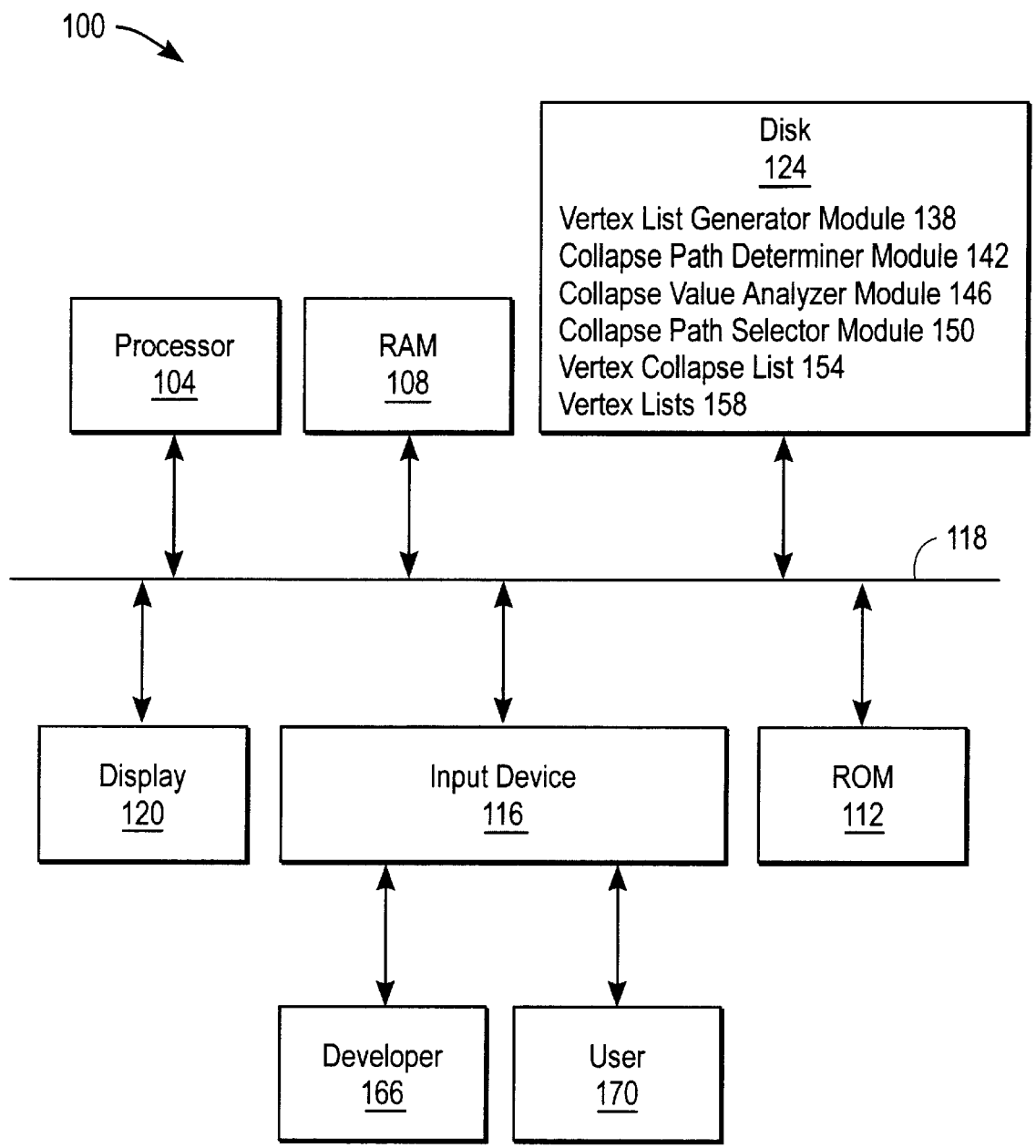
FIG. 1a is a block diagram of a preferred embodiment of a computer system in accordance with the present invention.

FIG. 1a illustrates a preferred embodiment of a computer system 100 in accordance with the present invention. System 100 is typically implemented on a computer system 100 such as a personal computer having an Intel Pentium™ processor and running the Windows™ 95 operating system from Microsoft Corporation. ROM 112 is read-only memory for storing data having unvarying functionality. Disk 124 stores data of which immediate access is not required, for example, the operating system module, databases, and other modules. In a one embodiment, as used by a developer 166, disk 124 stores a vertex list generator module 138, a collapse path determiner module 142, a collapse value analyzer module 146, a collapse path selector module 150, vertex lists 158 and a collapse list 154. In an embodiment used by a user 170, disk 124 stores applications, run time manager 162, and collapse lists 154. When access to the stored modules is required, the modules are moved to RAM 108, which stores data of which more immediate access is required. A display 120 and input device 116 are connected to the processor 104 through bus 118 and allow a user 170 or a developer 166 to interact with the modules stored in disk 124.

Figure 1B:
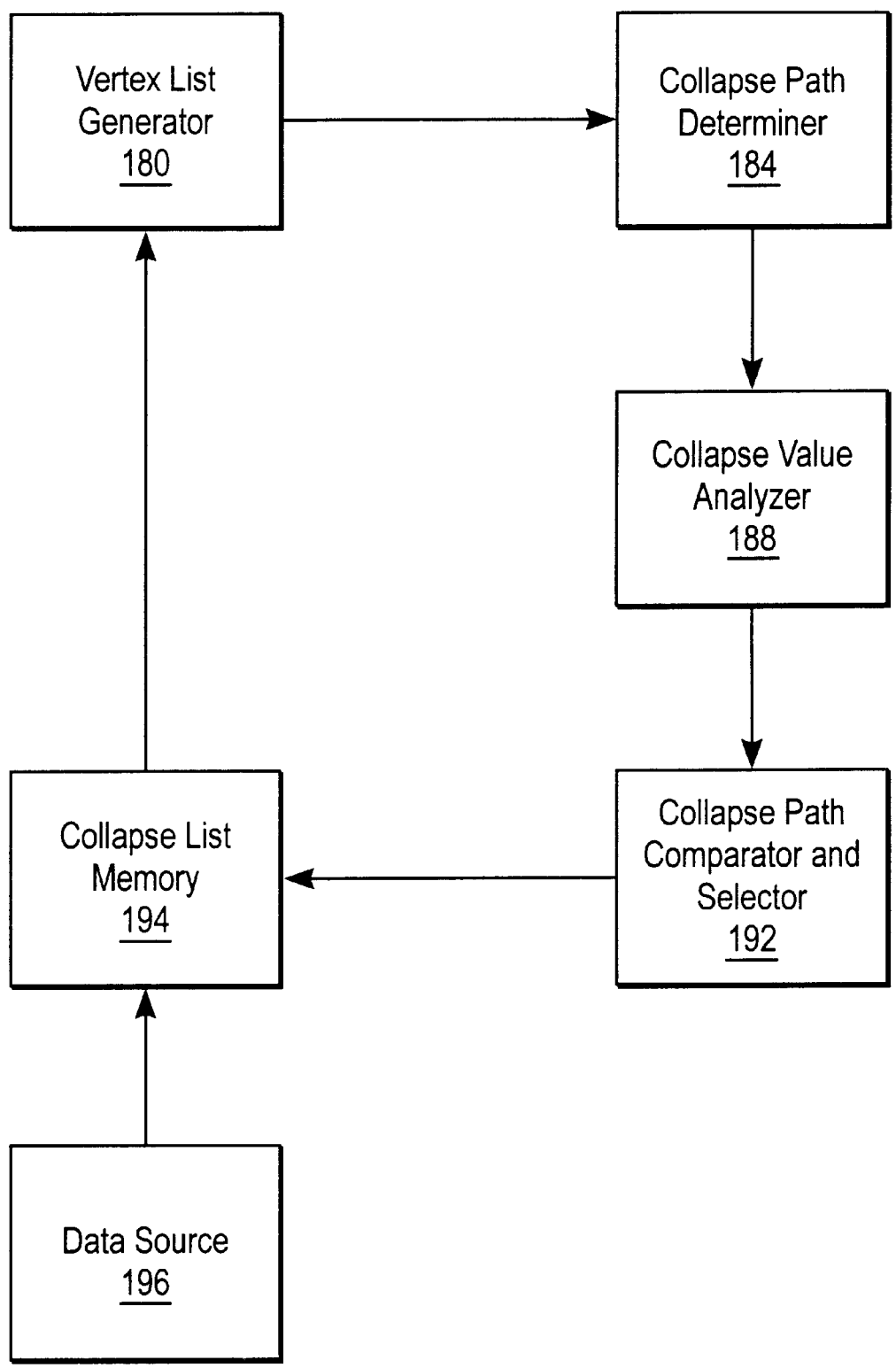
FIG. 1b is a block diagram of a preferred embodiment of a modular distributed architecture computer system in accordance with the present invention.

In FIG. 1b, a distributed architecture implementing a preferred embodiment of the present invention is illustrated.

A vertex list generator 180, comprising an application specific integrated circuit (ASIC) coupled to a memory, generates vertex lists 158. The vertex lists 158 are transmitted to a collapse path determiner 184 which determines collapse paths from the received vertex lists 158. The collapse path data is transmitted to a collapse value analyzer 188, which analyzes the collapse path data to determine collapse values for each collapse path. These values, along with the paths themselves, are transmitted to the collapse path selector 192, which selects a collapse path from the list of vertices which, if the object is collapsed along the selected path, causes the least visual distortion to a viewer watching the collapse. This selected path is stored in the collapse list memory 194, and the new set of vertices is generated by the vertex list generator 138 responsive to the selected collapse path. The system continues to generate and select collapse paths until the vertex list generator no longer has any vertices remaining from which to generate a list, and the processing of the system is thus complete. The final collapse list is transmitted from the collapse list memory to the processor 104 of the developer's computer 100.

The data source 196 stores the original vertex list for processing. Data sources include the application requesting the object modeling, or a secondary source which stores objects requiring modeling in accordance with the present invention. In one embodiment, the modules 138, 142, 146, 150 are implemented as a set of Field Programmable Gate Arrays, and are programmed to perform the separate functions described above. By compartmentalizing the separate functions in a distributed architecture, faster and more robust processing is achieved.

Figure 2A:
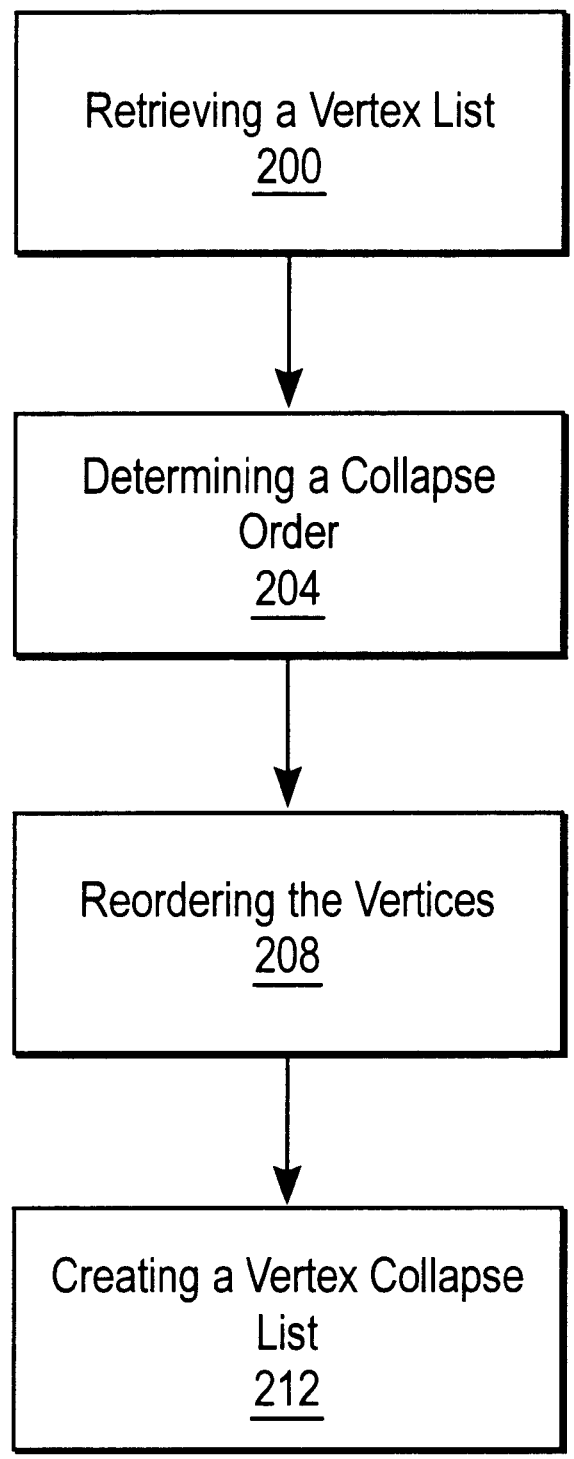
FIG. 2a illustrates an overview of a preferred embodiment of creating a collapse order list in accordance with the present invention.

FIG. 2a illustrates the processing of a preferred embodiment of the present invention for generating collapse orders. A vertex list 158 is retrieved 200. Typically, vertex lists 158 are provided by the developer 166 for each object the developer 166 would like to have modeled. The vertex list 158 may contain indices into a 3D coordinate map, or the vertex list 158 may index into other maps, such as texture maps, or normal maps. The vertex list 158 is usually "cleaned" prior to being processed. Typically, vertex lists 158 may specify triangles having edges close to one another but which do not actually overlap. Without performing any cleaning operations, these close edges cause the triangles they are a part of to be considered as two separate polygons, which may cause holes or cracks to appear at lower resolutions of the model. Thus, the system looks for redundant vertex data in the vertex list and eliminates the redundancies.

The vertex list 158 may specify a maximum set of vertices used in the object, or a maximum and a minimum set of vertices in the object. The minimum set of vertices is specified by the developer 166 to define a minimum quality level the object may not be collapsed beyond. As more vertices are collapsed in an object, the less realistic the object appears if examined closely. Therefore, for some objects the developer 166 may decide that there is a point beyond which the object is no longer recognizable as its true shape, even though the object at that point is very small on the screen and therefore does not require many polygons to specify sufficient detail. For these objects, the developer 166 specifies a minimum set of vertices to which the object may be collapsed. The system identifies these vertices during its processing, and does not collapse those vertices in the object. The vertex list 158 may also specify a nested set of vertex sets that represent progressively lower resolutions of the object. In this case the system generates a collapse list that interpolates between the nested vertex sets.

Figure 2B:
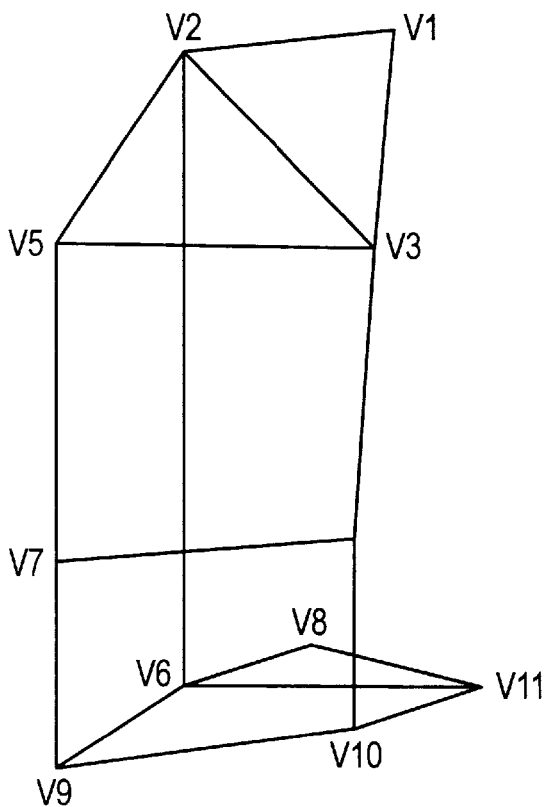
FIG. 2b illustrates a first instance of an object prior to having a vertex collapsed.
Figure 2C:
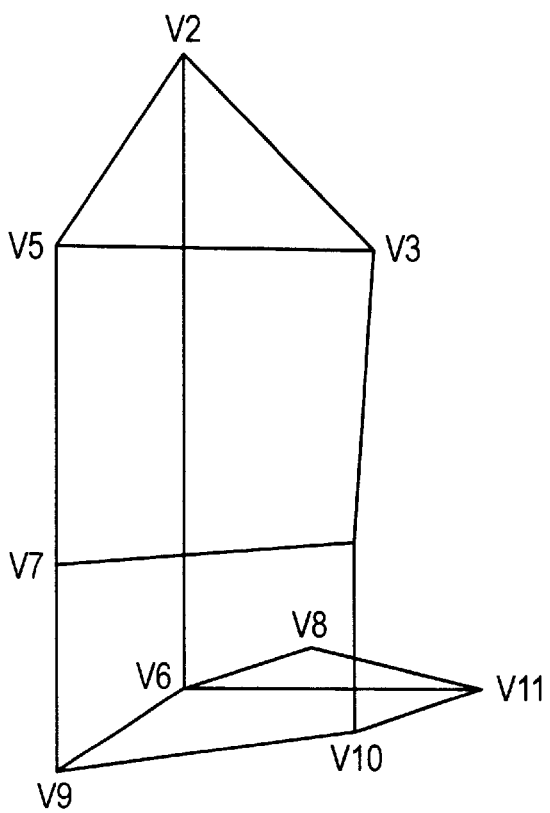
FIG. 2c illustrates the object of FIG. 2b after having a vertex collapsed in accordance with the present invention.

After the vertex list has been retrieved, the system proceeds to determine 204 a collapse order. The collapse order of an object is specifies the order in which individual vertices are merged into other vertices. Vertices are collapsed along collapse paths, with the goal of causing the least visual distortion possible for the object. For example, as shown in FIG. 2b, an object is shown having multiple vertices, three of which are specified as V1, V2, and V3. If the system in accordance with the present invention determines that the first collapse path is to collapse V1 to V2, the object as shown in FIG. 2c results. The object in FIG. 2c has less polygons to render than the object in FIG. 2b. Thus, the object in FIG. 2c is of lower resolution than the object in FIG. 2b, and should be displayed when the object is located closer to the background or due to other factors described in greater detail below, when added resolution is most likely to go unnoticed by the user 170. By displaying a version of the object which contains less polygons while it is closer to the background, the processor is able to devote more time to process objects which are closer to the foreground. This allows the objects in the foreground to have higher polygon counts without impacting on the frame rate.

After determining a collapse order for the object, the vertex list 158 is reordered 208 into the order specified by the collapse order. The vertex to be collapsed first is identified and the other vertices are sequenced accordingly based on their collapse priority. The system advantageously minimizes its footprint in memory by using the existing vertex list 158, instead of using another construct to store this information. Next, the system creates 212 a vertex collapse list 154. This list specifies the vertex to which the target vertex is to be collapsed; alternatively, the list specifies the vertices to which to connect an added vertex. When collapsing vertices in an object to achieve a lower resolution, the system may simply eliminate vertices as ordered in the vertex list until the desired resolution is obtained. However, in order to increase the resolution of the object by adding vertices, more information is needed. In each case, a correct triangle list must be generated by the system at the desired resolution. The triangle list specifies connectivity information regarding all of the triangles which must be rendered to achieve a given resolution.

Figure 2D:
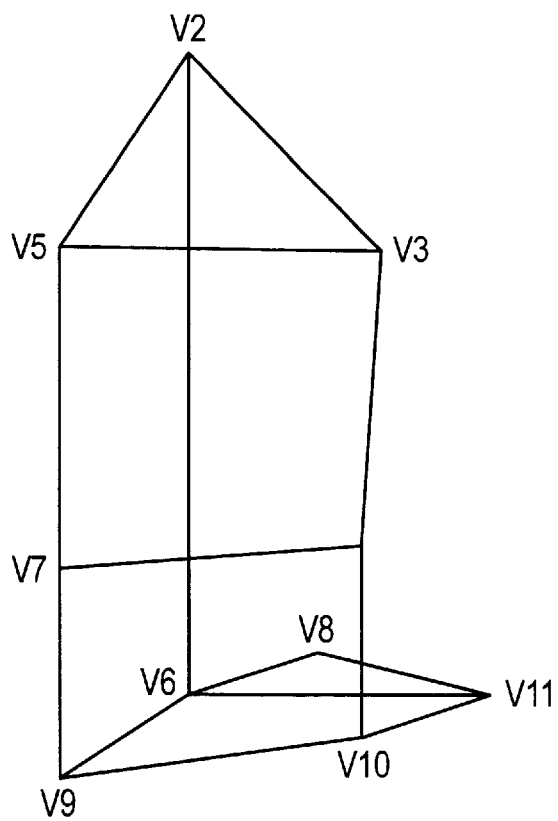
FIG. 2d illustrates an object at a lower resolution.
Figure 2E:
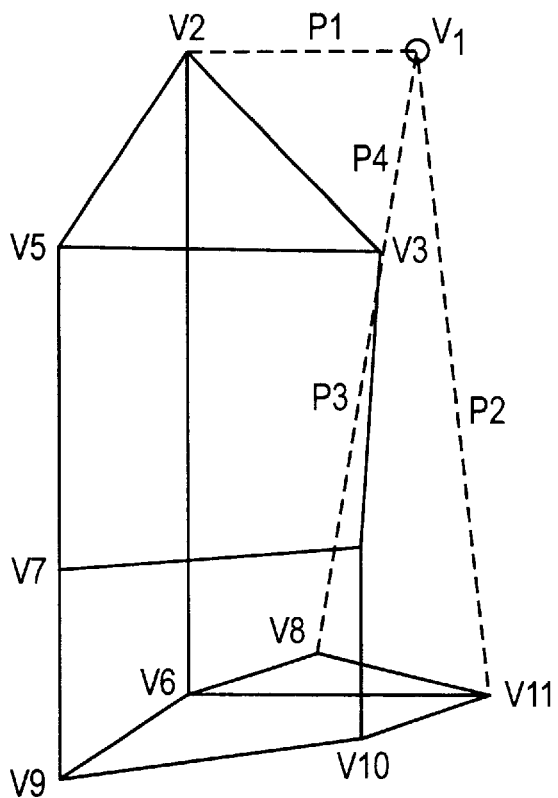
FIG. 2e illustrates the object of FIG. 2d with a vertex added.

For example, as shown in FIG. 2d, an object is in a first, lower resolution state. In FIG. 2e, a vertex is added to the object to increase the number of polygons and thereby increase the resolution of the object. However, as is shown, without more information, the system does not know which vertices to connect to the new vertex. Thus, more information is stored in a vertex collapse list 154. The vertex collapse list 154 stores the connectivity information for the neighbor vertices to which each vertex is connected. In the example of FIGS. 2d and 2e, the vertices to which to connect V1 are also specified in the vertex collapse list 154, and thus the system knows the correct edges to draw. Using the connectivity information, a correct triangle list is generated for each resolution. In a preferred embodiment, the information regarding the two lists 154, 158 are stored in the same location to optimize processing. The term list is used descriptively, as arrays and other data structures are preferably used to store the collapse information.

Figure 3:
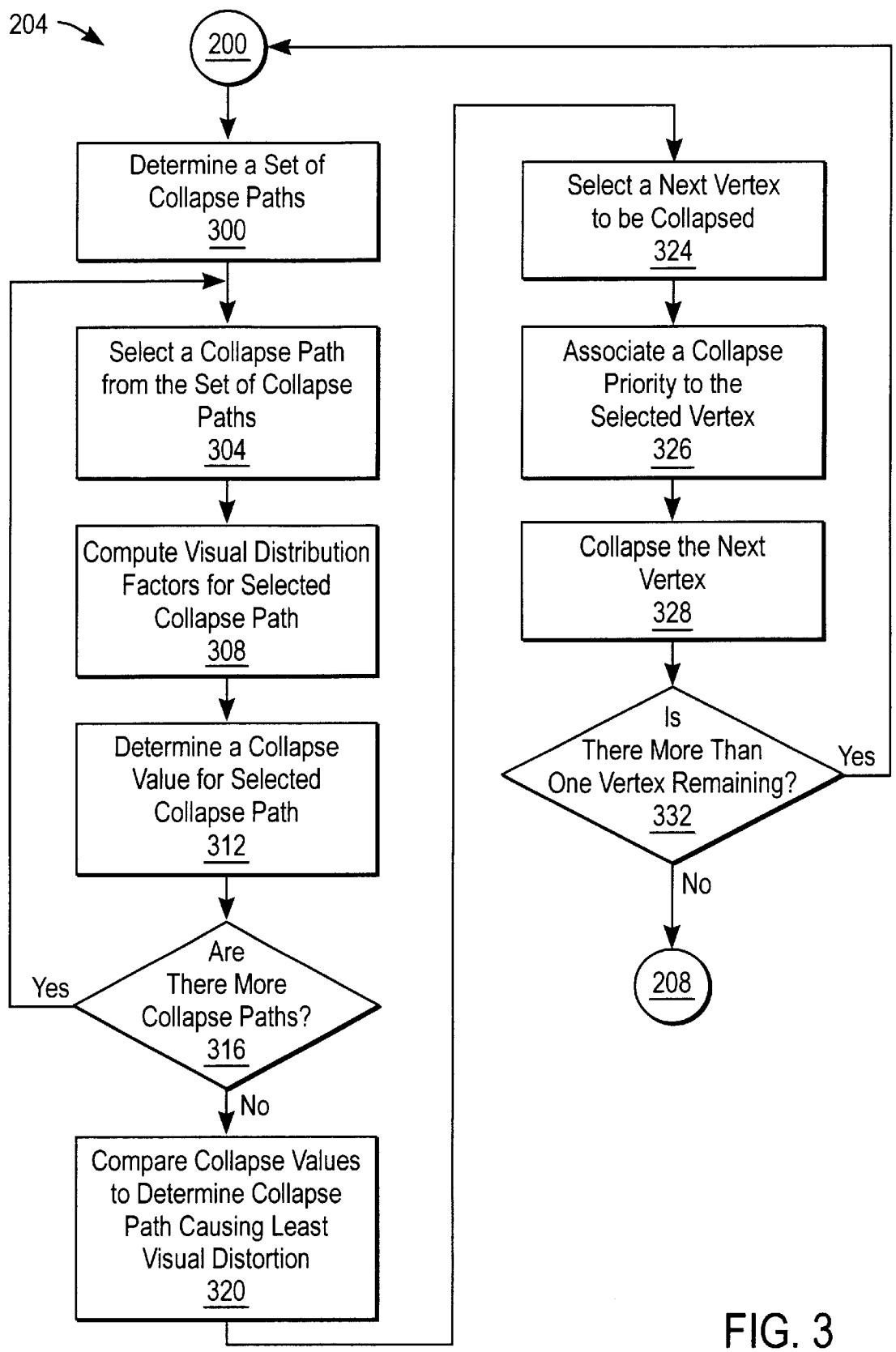
FIG. 3 is a more detailed diagram of a preferred embodiment of determining a collapse order in accordance with the present invention.

FIG. 3 is a more detailed diagram of a preferred embodiment of determining a collapse order in accordance with the present invention. First, a set of collapse paths is determined 300. A set of collapse paths identifies every possible collapse path between each vertex and every other vertex to which it is connected, at the current resolution of the object. Thus, in the object of FIG. 2b, there are 11 vertices (V1–V11). For V2, four potential collapse paths (C1, C2, C3, C4) may be identified.

Next, a collapse path from the set of collapse paths is selected 304. Visual distortion factors are computed 308 for the selected collapse path. Visual distortion factors are measurements of the effect of a given collapse on the object. Some collapse paths will have a much greater visual effect on the user than others. For example, if V1 is collapsed to V2, the object will appear to shrink noticeably in width. However, if V8 is collapsed to V11, the object will not appear as distorted to the user. The system preferably captures these distinctions by computing several visual distortion factors, including area change, angular deviation, and local volume change, described in greater detail below.

Each collapse path is given 312 a collapse value as a function of the computed visual distortion factors for that path. The collapse value is preferably a weighted combination of the visual distortion factors for the path. Weighting the different factors allows the developer 166 to specify the importance of the factors as applied in the particular application being developed.

The system determines 316 whether there are more collapse paths. If there are more collapse paths, a next path is selected 304 and the process described above is repeated. If there are no more collapse paths, the system compares the collapse values of the collapse paths to determine 220 a collapse path which causes the least visual distortion to the object.

The vertex to be collapsed is identified 324 responsive to the determined collapse path, and a collapse priority is assigned 326 to the vertex to be used upon reordering the vertex list. The object is collapsed 328 along the collapse path. The system determines 332 if there are more than one vertex not in the minimum point set remaining. If there are not, the system then moves to reordering the vertex list 158. If there are more than.one vertex remaining, the system repeats the above process, treating the collapsed object as a new object to be processed. The system processes the object until a set of collapse paths are determined which cause the least visual distortion to the object, and reduce the object from a maximum resolution to a minimum resolution. For each collapse path stored, the vertices to which the target vertex is connected, and the change in connectivity as expressed by the triangle list are stored. When the vertex is added to the object, this allows the system to know which other vertices are connected to the added vertex by which triangles. This information is stored in the vertex collapse list 154, as described above.

Figure 4:
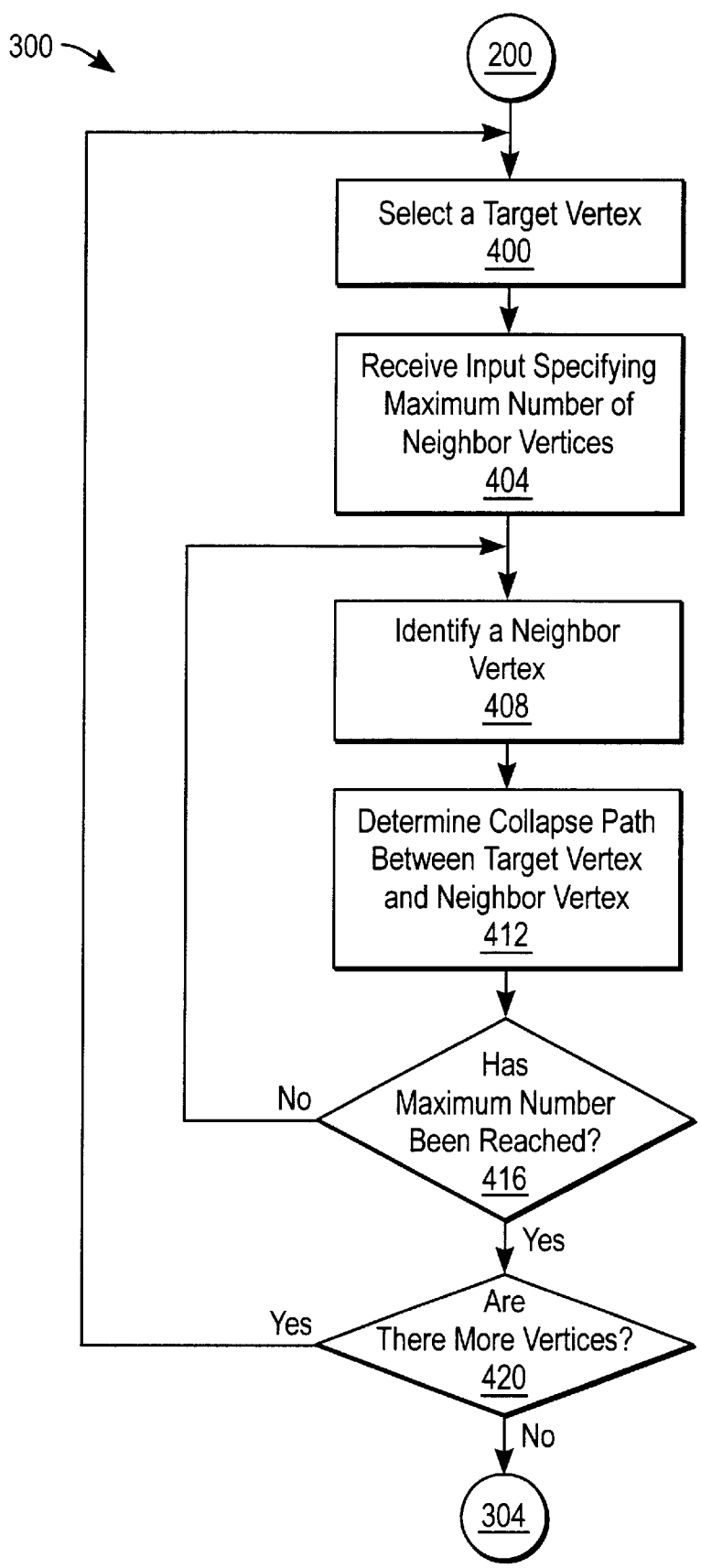
FIG. 4 is a more detailed diagram of a preferred embodiment of determining a set of collapse paths in accordance with the present invention.

FIG. 4 illustrates an alternate embodiment of the method of determining a set of collapse paths. A target vertex is selected 400. Any one of the existing vertices of the object may be selected; order does not matter. Next, an input is received 404 which specifies the maximum of neighbor vertices to examine for each vertex. This allows a developer 166 to control the processing time of the system. By limiting the number of neighbor vertices which may be examined by the system for each vertex, the system does not have to perform as many calculations.

Next, a neighbor vertex is identified 408. A neighbor vertex is a vertex connected along an edge to the target vertex. A neighbor vertex would include any vertex directly connected to the target vertex, as well as any vertex which is connected to the target vertex through another vertex or vertices. As can be imagined, this list may grow very large if every vertex is processed. However, as described above, a maximum number of neighbor vertices may be specified to minimize processing.

After identifying a neighbor vertex, a collapse path is determined 412 between the target vertex and the neighbor vertex. The system determines 416 whether the maximum number of collapse paths have been reached. If it has, the system determines 420 whether there are more vertices. If there are more vertices, the collapse paths for the other vertices are computed as described above. If there are no more vertices, the system selects 304 a collapse path from the set of collapse paths.

Figure 5:
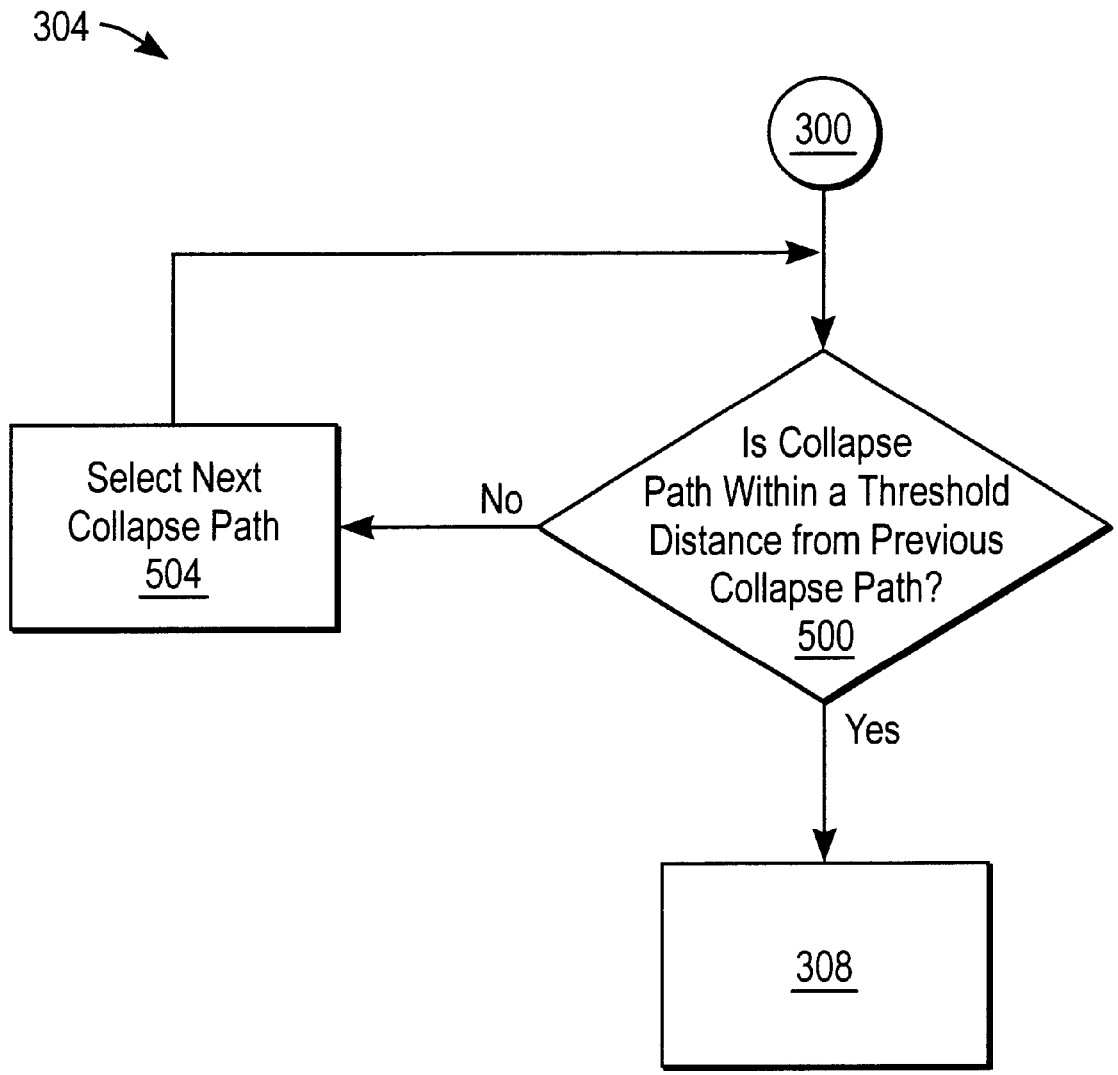
FIG. 5 is a more detailed diagram of a preferred embodiment of selecting a collapse path in accordance with the present invention.

FIG. 5 illustrates one embodiment of selecting a collapse path. In this embodiment, processor computations are minimized by limiting the number of collapse paths which are to have collapse values. For the first iteration through the object, collapse values are computed for every collapse path. After collapse path is selected, the object is collapsed along the path. A new set of collapse paths are generated as described above. However, in this iteration, collapse values are generated for those collapse paths which are within a predefined distance from the collapse path which was previously used to collapse the object. Many collapse paths will remain the same after the previous collapse, and their collapse values, i.e., the objective measurement of the visual impact of their collapse on the object, will also remain the same.

For example, in FIG. 2b, if C1 is chosen to be the collapse path, the FIG. in 2c results. The collapse value for the path between V8 and V11 may remain the same in the two versions of the object because the vertices around V8 and V1 are not affected by the collapse of C1. Therefore, there is no need to recompute the collapse value for the V8-V11 path. By not computing the visual distortion factors for every collapse path after very collapse, the computations of the system are greatly minimized, and the processing becomes much faster.

Thus, as shown in FIG. 5, the system determines 500 whether a collapse path is within a threshold distance from the previous collapse path. The threshold may be preset or defined by the developer 166. The developer 166 may experiment with different thresholds to maximize accuracy while minimizing computations. If the collapse path is within the threshold, the system computes 308 visual distortion factors for the collapse path. If the collapse path is not within the threshold, the existing collapse value is continued to be used as the value for that path, and a next path is selected.

Figure 6:
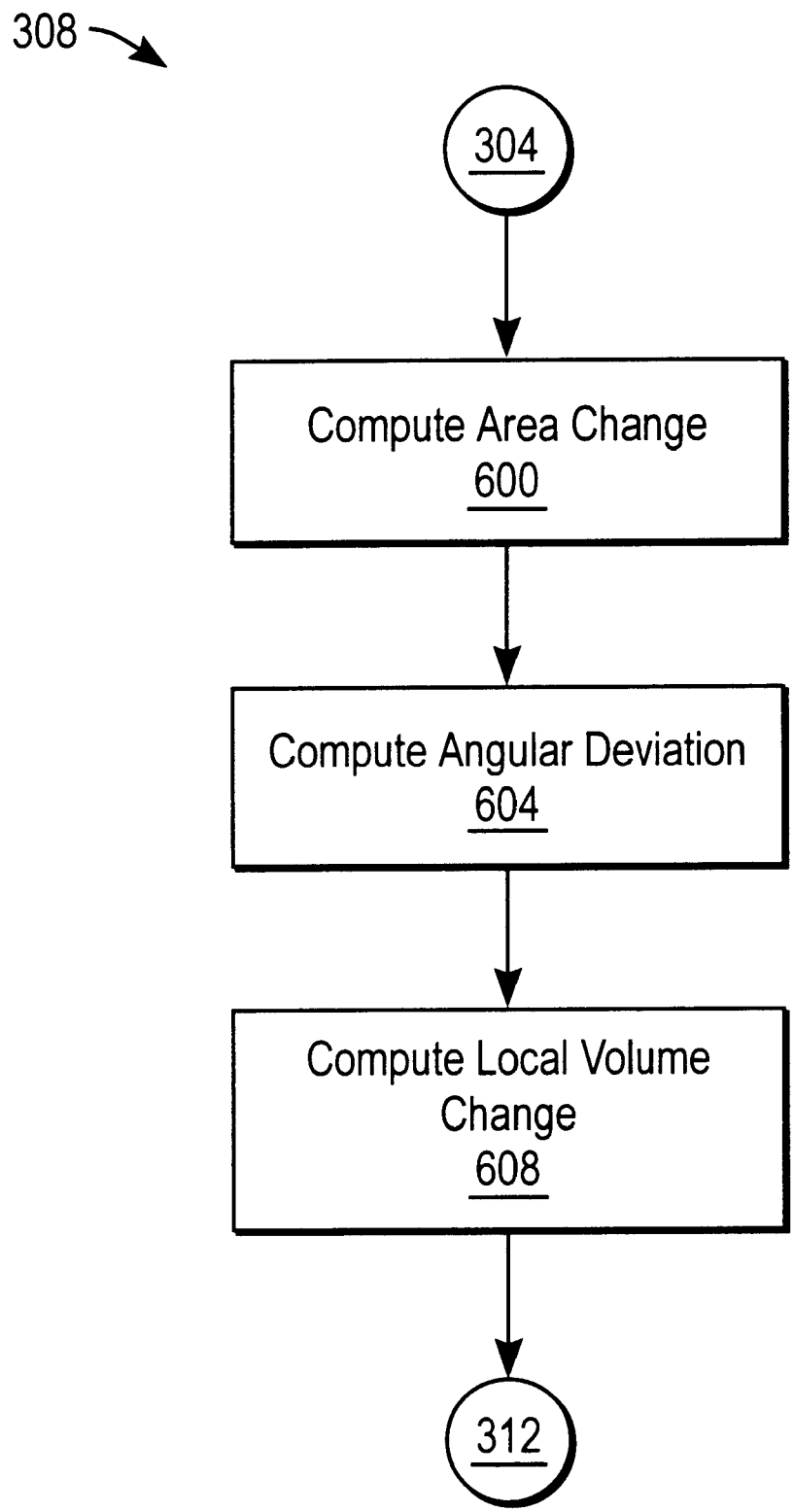
FIG. 6 is a more detailed diagram of a preferred embodiment of computing visual distribution factors in accordance with the present invention.

FIG. 6 illustrates three visual distortion factors preferably computed in accordance with the preferred embodiment of the present invention. First, the area change of the object is computed 600 in response to collapsing the object along the selected collapse path. The area change of the object is computed by computing the surface area of the object prior to the collapse, and then computing the surface area of the object after the collapse. Subtracting the difference between the two areas indicates the effect on the surface area of the object performing the collapse will have. Next, the angular deviation is computed 604 in response to collapsing the object along the collapse path. Angular deviation measures the effect on the local curvature of the object the collapse will have. The system calculates normals of the triangles of which the vertex is a part. Points which represent high curvature are more important to the visual appearance of an object. Thus, these points are assigned a measure which lowers their collapse priority. Third, the local volume change is computed 608 in response to the collapse. A pyramid is created from the target vertex, using the target vertex as the apex of the pyramid. The base of the pyramid is the triangle formed by three consecutive neighbor vertices. A sequence of these pyramids is constructed from successive triples of neighbor vertices, and their volume is summed. The volume of the object is determined, the target vertex is collapsed along the collapse path, and the volume is computed again. The change in volume is used as an indication of the affect on the visual appearance of the object. Calculating pyramidal "local volume" change is much faster than calculating the "true" volume of an object, and more accurately accounts for the topology of an object. Other measures of visual distortion known to those of ordinary skill in the art may also be used in accordance with the present invention. Statistical measures of error such as surface deviation can also be used to compute visual distortion.

Figure 7:
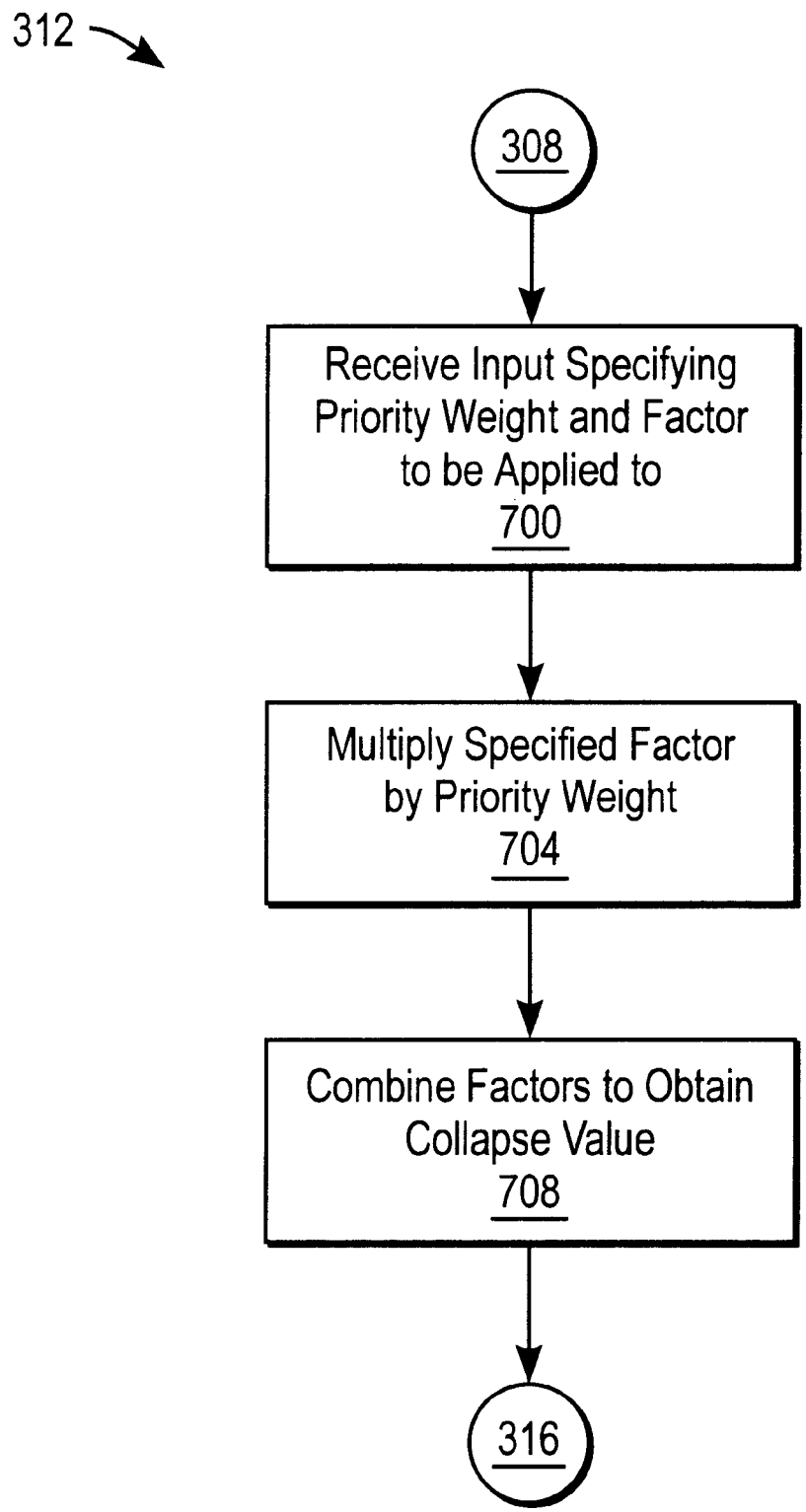
FIG. 7 is a more detailed diagram of a preferred embodiment of determining a collapse value for a selected collapse path in accordance with the present invention.

FIG. 7 illustrates an alternate embodiment of determining a collapse value for the selected collapse path. In this embodiment, the system receives 700 an input from the developer 166 specifying a priority weight for the different factors. The system multiplies 704 the factors by the specified priority weights, and then combines 708 the factors to obtain a collapse value. Allowing the developer 166 to specify the weights allows more creative control for the developer 166. The developer 166 may decide that the object is very spiky, and therefore the angular deviation factor should be given the highest priority. The developer 166 would then specify a high weight for the angular deviation factor. Those collapses which have a large angular deviation factor would be prioritized lower for collapsing. If an object represents an organic shape, the local volume factor becomes more important. A developer 166 would specify a higher weight for the local volume factor, and those collapse having a great effect on local volume would be prioritized lower. If the developer 166 does not specify weights, default values which evenly weight the factors are used. In one embodiment, the developer 166 is able to increase the speed of the processing of the system by eliminating factors from consideration. For example, the developer 166 may determine that local volume change is not relevant to a specific object. The developer 166 then specifies that local volume change should not be computed for this object. The system is then able to process the object much faster.

Figure 8:
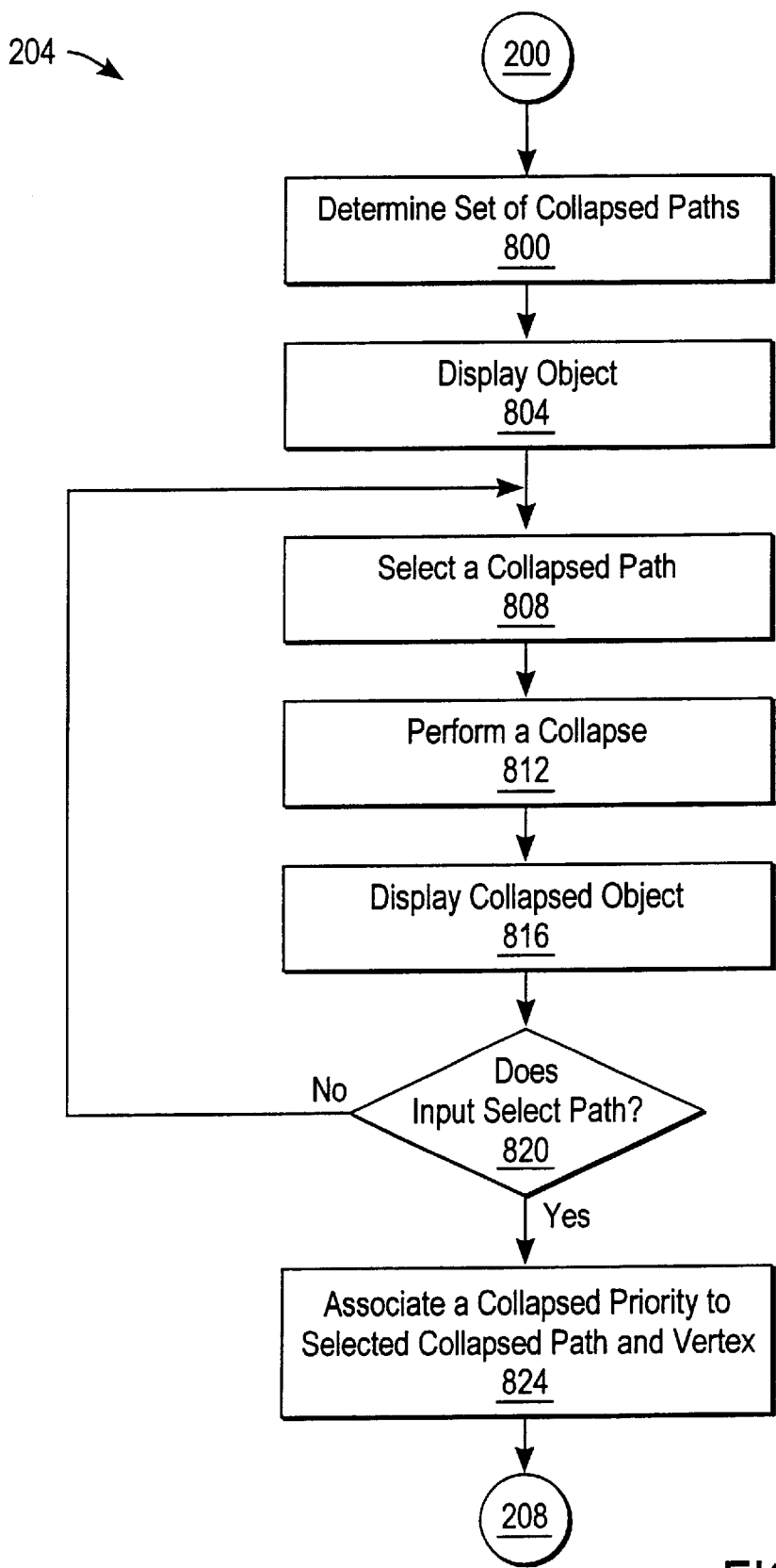
FIG. 8 illustrates an alternate embodiment of a preferred embodiment of determining a collapse order in accordance with the present invention.

FIG. 8 illustrates an alternate embodiment of the determining a collapse order step 204. This embodiment allows the developer 166 to "tweak" the collapse order interactively. As the visual distortion of an object is essentially a subjective determination, the present invention beneficially allows the developer 166 to introduce their subjective preferences into how the object is collapsed. First, the set of collapse paths is determined 800 as described above. Then, the object is displayed to the user at the current resolution level. If this was the first iteration, the object would be at the maximum resolution level. The system selects a collapse path randomly from the set of collapse paths, and the object is collapsed. The system displays the collapsed object to the developer 166, and the developer 166 can see the effect of the collapse on the object. If the developer 166 approves of the collapse, the developer 166 selects the path. If the system receives 820 an input selecting the path, the system associates a collapse priority for the path based on the number of paths which have already been selected. If the developer 166 does not approve of the collapse, a next collapse path is selected and the process is repeated.

In one embodiment, collapse values are calculated for each path and the paths are prioritized as described above. The path designated to be collapsed first is chosen as the first path to be collapsed and displayed to the developer 166. If the developer 166 selects this path, the path retains its priority. A new set of collapse paths is generated and the highest prioritized path from the new set selected for display to the developer 166. If the developer 166 does not select the path, the next highest prioritized path is selected and displayed to the developer 166. Of course, the developer 166 may specify at any time a particular path the developer 166 sees in the object the developer 166 wants collapsed. Such a selection by the developer 166 overrides any previous prioritization by the system.

Figure 9:
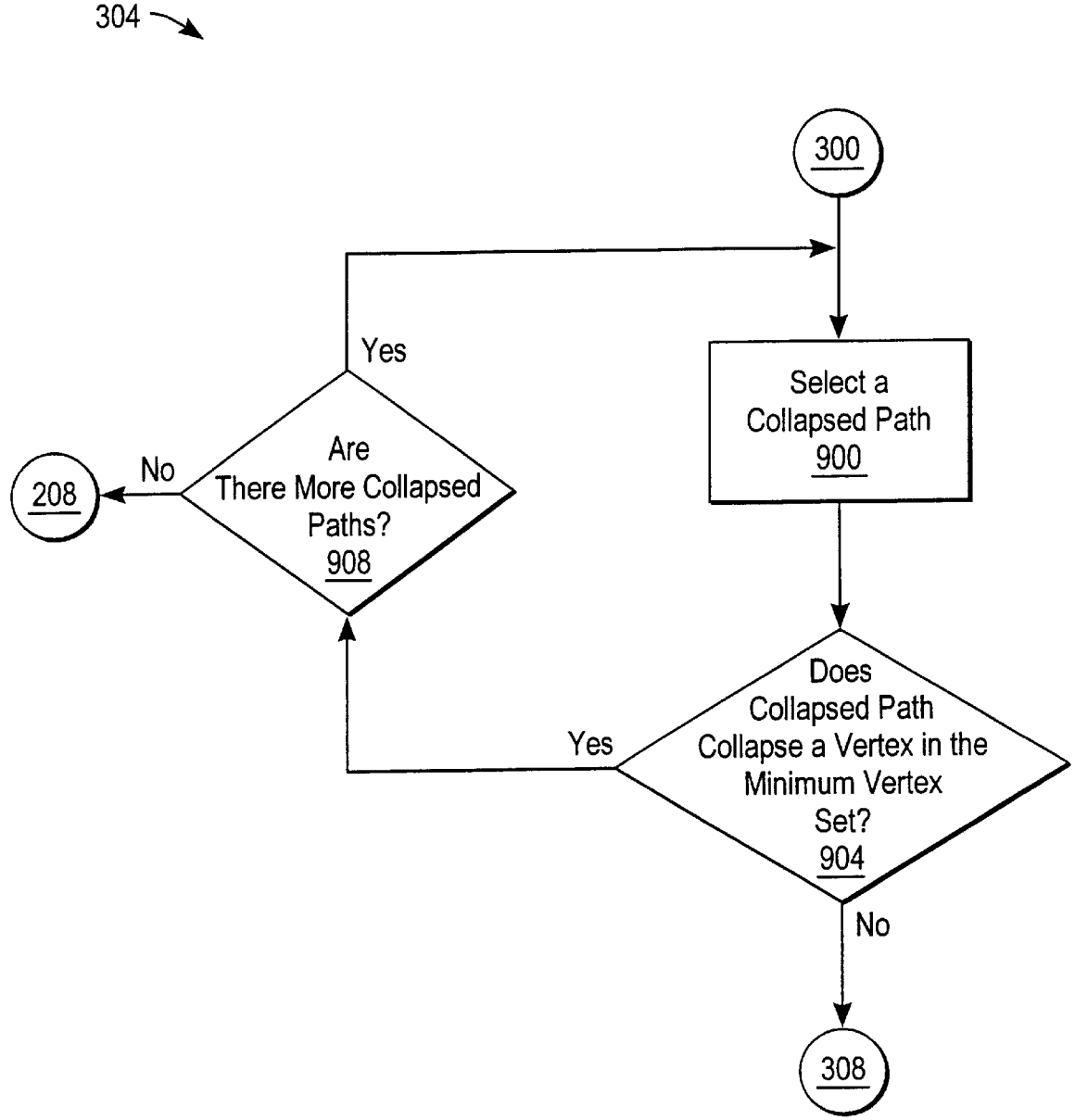
FIG. 9 illustrates an alternate embodiment of determining a set of collapse paths in accordance with the present invention.

FIG. 9 illustrates an embodiment of the present invention in which a minimum vertex set is specified by the developer 166 prior to computing collapse paths. A minimum vertex set, as described above, is a set of vertices which the developer 166 does not want collapsed. Thus, as shown in FIG. 9, after a collapse path is selected 900, the system determines whether the collapse path collapses a vertex specified in the minimum vertex set. If the vertex is on the minimum vertex set, the collapse path is not selected.

In another embodiment, texture maps are indexed by the vertices. Texture maps provide texture for the mapped area, giving an object a realistic appearance. Textures for different triangles may be quite different. Therefore, when a triangle is collapsed, the system must determine the affect of the loss of the texture of the triangle on the appearance of the object. Vertices which are on the edges of texture discontinuities are not collapsed, because of the affect the collapse will have on the appearance of the object. Thus, when collapse paths are selected, the vertices in the path are examined to determine if they are located on the edge of a texture discontinuity. If they are, the collapse path is not selected.

Figure 10:
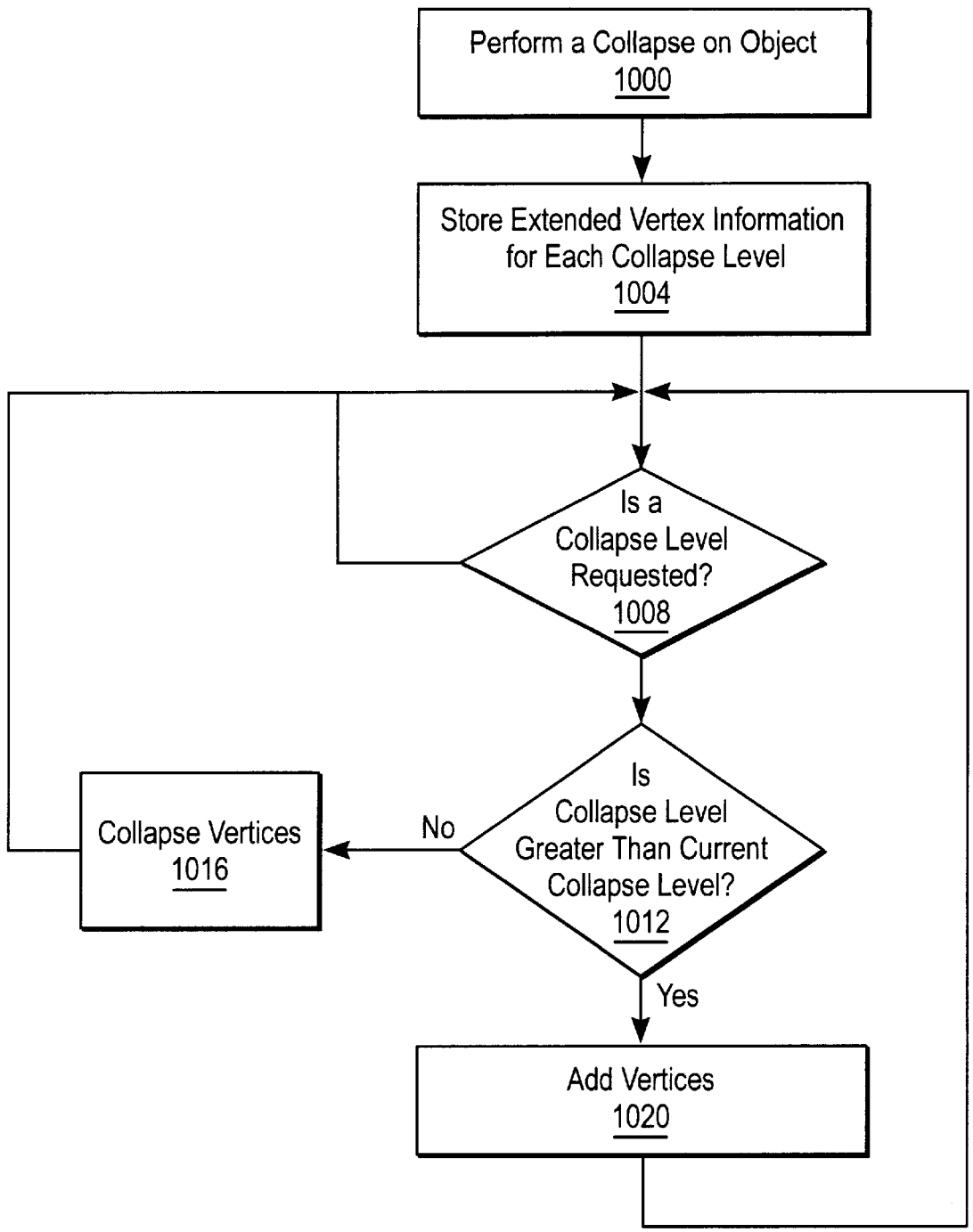
FIG. 10 is a flow chart illustrating a preferred embodiment of the runtime manager in accordance with the present invention.

FIG. 10 illustrates the run-time manager of the present invention. The run-time manager performs the adding and subtracting of polygons to and from the object as required during the real-time execution of the application. The run-time manager works in conjunction with the graphics system of the computer and the application program for which the objects have been processed. Upon initiating the application, the manager collapses 1000 the objects referenced in the application. The manager stores 1004 extended vertex collapse information for each collapse level of the objects in a table. Extended vertex collapse information is the information stored in the vertex collapse list 154 specifying what vertex the each collapsing vertex will collapse to, as well as which triangles need to be eliminated from the model. By storing the extended vertex collapse information in the table, the processor is able to more quickly add and subtract polygons because the processor simply has to access the table to determine which vertices and triangles to add, subtract, or re-index and does not have to perform any demanding computations.

In one embodiment, the extended tables for each object are already created in the development stage, and the tables are simply loaded into data memory for easy access when the application is initiated. The runtime manager awaits a request from the application for a collapse level from an object. The original appearances of each object are represented in a default resolution. When the application or the graphics program requests 1008 an increased or decreased resolution from the runtime manager, the runtime manager determines 1012 whether the requested resolution requires a collapse level greater than the current collapse level of the object. The current collapse level is known because the current collapse level of the object is the only version of the object which is stored in memory. If the requested resolution requires a greater collapse level for the object, vertices are added to the object in accordance with the vertex collapse information in the table until the requested collapse level is met. This continuous addition of vertices provides for a smooth rendering of the object, and eliminates the object-popping problem discussed above. Similarly, if the requested resolution requires a collapse level which is less than the current collapse level, vertices are collapsed 1016 until the proper resolution of the object is achieved. The table allows for instantaneous addition and subtraction of polygons to the object upon request. The table also allows for a minimal memory footprint by the present invention as entire versions of the objects are not required to be stored. The continual addition or subtraction of polygons to an object eliminates the object-popping artifacts. Thus, in accordance with the present invention, an efficient, high-speed object modeling process is disclosed which provides multiple levels of resolution while minimizing resource use.

Figure 11:
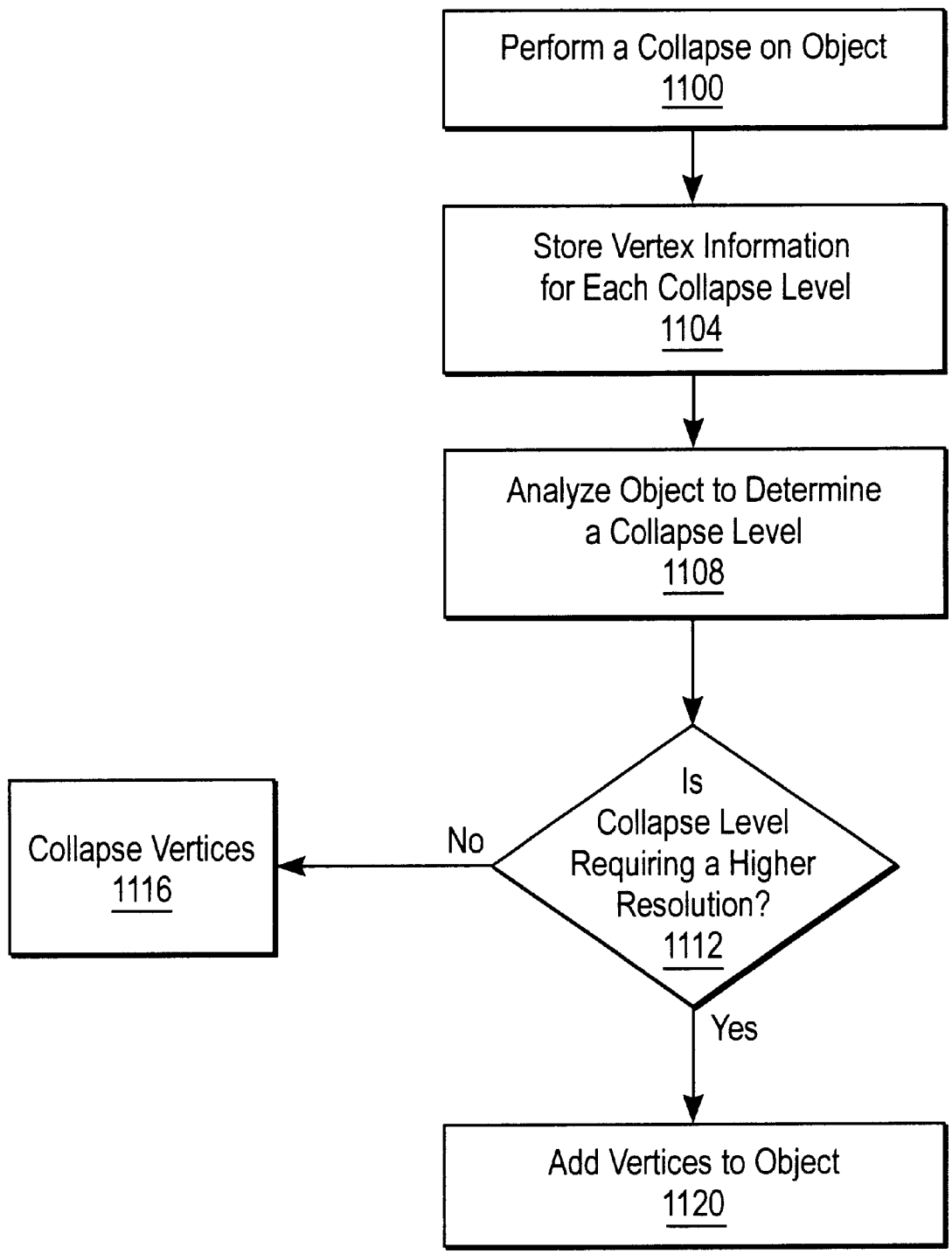
FIG. 11 is an alternate embodiment of the runtime manager in accordance with the present invention.

FIG. 11 illustrates an alternate embodiment of the runtime manager in which objects are analyzed to determine a collapse level. In this embodiment, the object is collapsed 1100 and vertex information is stored 1104 for each collapse level, as described above. However, in this embodiment, the object is analyzed 1108 to determine an optimal collapse level. If the manager determines 1112 the optimal collapse level requires a higher resolution, vertices are added 1120 to the object. If the optimal level requires a lower resolution than the current resolution, vertices are collapsed 1116.

Figure 12:
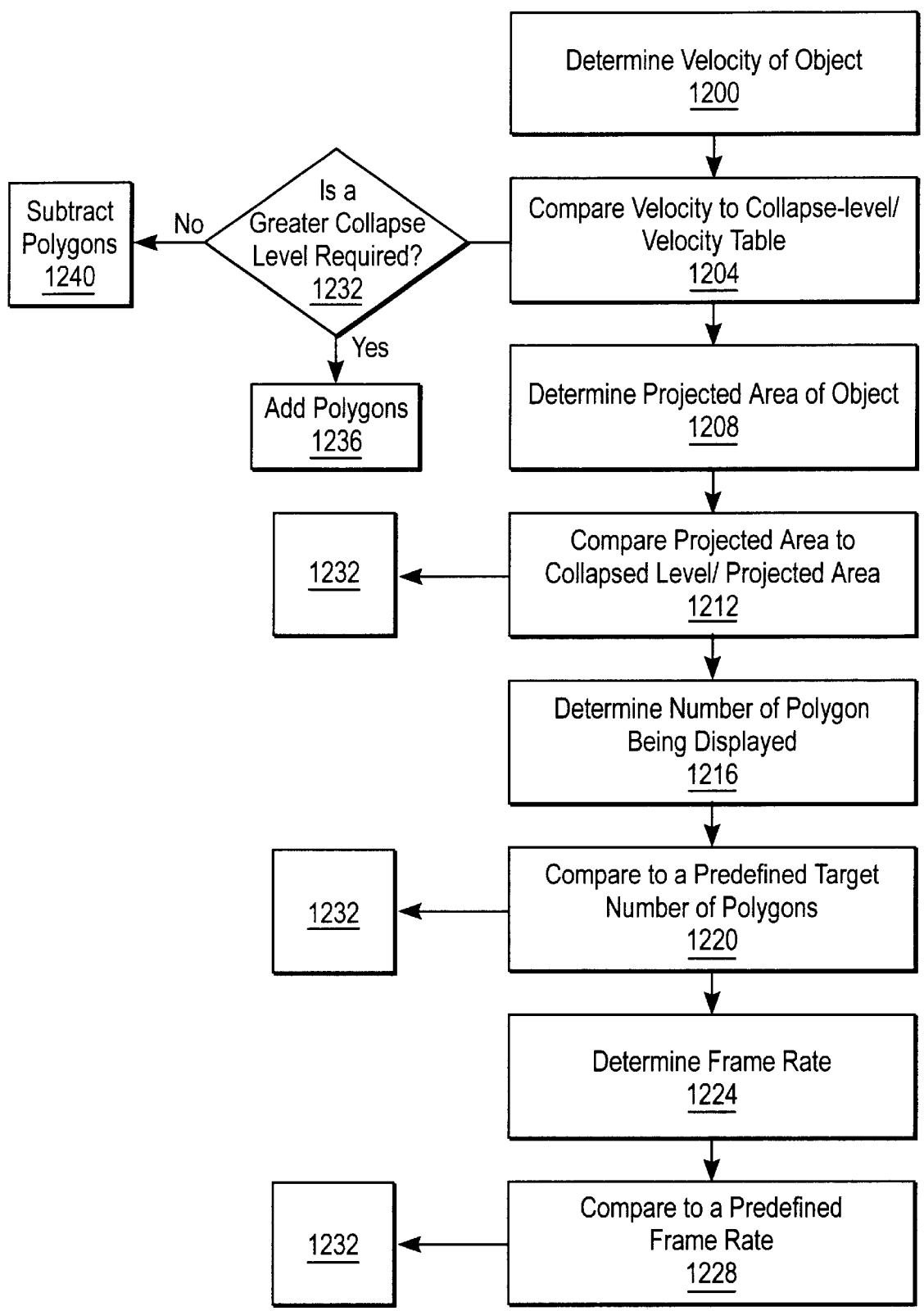
FIG. 12 illustrates embodiments of analyzing the optimal collapse level of an object in accordance with the present invention.

FIG. 12 illustrates several methods for analyzing the optimal collapse level of an object. One or all of these methods can be used in accordance with the present invention to determine an optimal collapse level. First, the velocity of the object is determined 1200. The velocity of an object is determined by measuring the distance an object moved between the current frame and the last frame, and dividing by the time elapsed between frames. Alternatively, velocity is calculated by measuring distance traveled over several of the most recently rendered frames and dividing by the total elapsed time of the rendering of the whole recent frame sequence. Next, the determined velocity is compared to a table which maps velocities of the object to collapse levels. This table may be specifically designed for a given object, or may be a global table which provides general correlations between velocity and collapse level. As an object increases in speed, it requires less resolution to render it realistically, as motion tends to blur the finer details in an object. Therefore, the object's current velocity is compared to the table to determine what resolution it requires at that speed. If the manager determines 1232 that the resolution required is a collapse level greater than its current collapse level, more polygons are added 1236 as described above. If the resolution the object requires is less than the resolution provided by the current collapse level, polygons are subtracted 1240 away. Thus, the runtime manager dynamically manages the resolution of the object to provide optimal fidelity while minimizing the use of processing power.

The projected area of an object is another factor which is used by the runtime manager to determine an optimal collapse level for an object. The projected area of an object is the area which the object will occupy as rendered on the display. The greater the projected area of an object, the higher the resolution that is required. The system determines 1208 the current projected area of the object, and compares 1212 the projected area to a table which correlates projected area and collapse levels. The polygon count is then adjusted 1232 accordingly.

The present invention also provides for global polygon count management. In this embodiment, the user selects a target polygon count for each frame. In this embodiment, the system determines 1216 the number of polygons currently being displayed in a frame. The total number of polygons displayed in a frame may be calculated by determining which objects are on screen and totaling the number of polygons in each object, or by having the renderer keep an internal tally of how many triangles it drew on screen in one frame. This number is compared 1220 to the predefined target polygon count. If the runtime manager determines 1232 that the current polygon count is less than the target polygon count, more polygons are added 1236. If the current polygon count is greater than the target polygon count, polygons are subtracted 1240 away. The determination of which objects to add and subtract polygons to and from may be made in a number of ways. Polygons may be added and removed uniformly to and from all polygons. Alternatively, objects may be individually analyzed and polygons added and subtracted on an individual basis.

Alternatively, the user 170 is able to select a target frame rate. The manager determines 1224 a current frame rate by monitoring the processor clock and determining how long it is taking to render frames. The current frame rate is then compared 1228 to the target frame rate. If runtime manager determines 1232 that the current frame rate is faster than the target frame rate, polygons are added 1236 to the frame to slow the frame rate down. If the current frame rate is slower than the target frame rate, polygons are subtracted 1240 from the frame to speed the frame rate up. Thus, the runtime manager allows for dynamic global polygon management requiring minimal input from the user 170. This management process allows the present invention to be platform universal, as if the invention is used on a system with a slower processor, the target frame rate or polygon count may be set lower, and the benefits described above are still provided. However, a system with a faster processor can be set to have a higher frame rate or polygon count, and the higher processing power of the system is maximized by the present invention.

Figure 13:
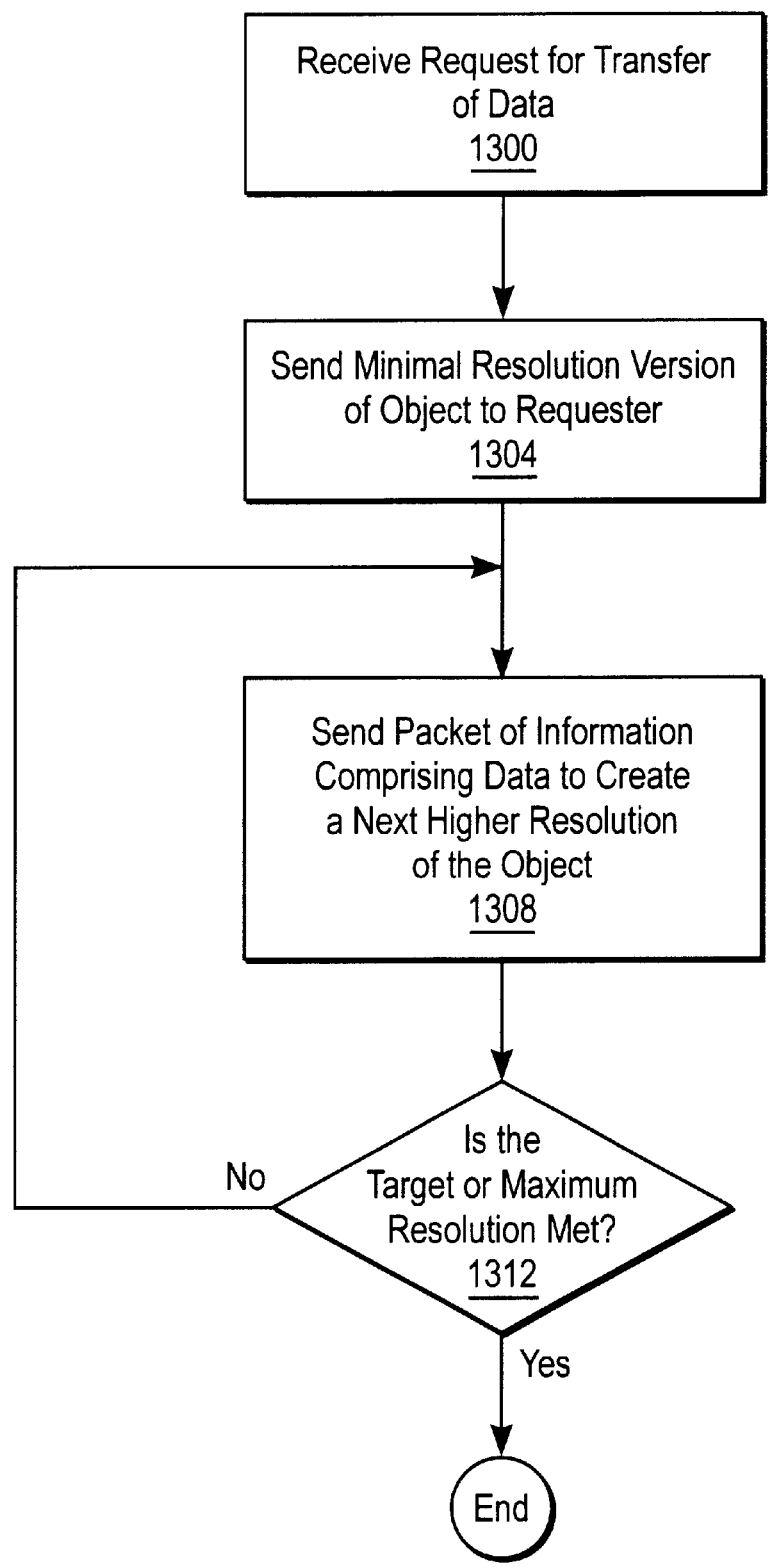
FIG. 13 illustrates an embodiment of the present invention for use in the remote transfer of data.

The present invention may also be used to transmit data through remote connections, as illustrated in FIG. 13. When receiving data over a remote connection, for example, the Internet, a user 170 is often waiting for data to download before a requested object may be displayed. In accordance with the present invention, upon requesting an object over a remote connection, the minimum vertex set, or the lowest collapse level of an object is transmitted to the user 170. This minimal resolution version of the object requires less data to represent, and therefore is transmitted much faster to the user 170. Then, the additional collapse levels are sent serially to the user 170 to increase the resolution of the object to its maximum resolution. As each collapse level typically adds only a few polygons, each collapse level is also transmitted very quickly. This method allows the user to receive a minimal version of the object very quickly, and then a full resolution later in time. If the user 170 does not require a full resolution of an object, the user 170 does not have to wait for unnecessary data (higher resolution data) to be transmitted before the user 170 can see the object. Even if the user 170 requires a higher resolution short of the maximum resolution, the present invention transmits the higher resolutions in packets which allows the user 170 to view the object in a shorter period of time than it would take to wait for the entire maximum resolution version of the object to download.

As shown in FIG. 13, a request is received 1300 for an object across a remote connection. Responsive to this request, a minimal resolution of the object is sent 1304 to the requester. This minimal resolution of the object is the lowest resolution of the object which may be displayed and still accurately describe the object. If a minimal vertex set of the object has been specified by the developer 166, this set is used as the minimal resolution to be sent. Next, a packet of information which comprises the vertices required to increase the collapse level of the object to a next higher resolution is sent 1308. This information comprises the vertices and the connections required to increase the resolution of the object, as described in detail above. Then, the system determines 1312 whether a maximum resolution or target resolution has been sent. If the packet which comprises the information required to increase the resolution of the object to its maximum resolution has been sent, the system knows the maximum resolution has been achieved. Alternatively, a target resolution may be specified by the user 170 in requesting the download of the object. The target resolution option allows the user to optimize the time required for the data transfer to meet the user's fidelity needs. If the user 170 does not require a maximum resolution of an object, the user can so specify, and only an intermediate resolution of the object is sent. This option is beneficial if, for example, the user 170 is in a hurry to view objects other than the one being downloaded, or the user 170 has a computer which is not capable of viewing high resolutions. If the target or maximum resolution has not been met, another packet is sent to the user 170. Once the target is met, the data transmission is complete.

What is claimed is:

1. A method for creating a three-dimensional visual representation of an object having multiple resolutions, comprising the steps of:
   retrieving coordinates of vertices for the object;
   determining a collapse order for the vertices identified in the vertex list;
   reordering the vertices identified in the vertex list responsive to the determined collapse order;
   creating a vertex collapse list responsive to the collapse order where the vertex collapse list specifies, for a target vertex, a neighbor vertex to collapse to;
   using the vertex collapse list and a level of detail to identify at least one display vertex of the object; and
   rendering the display vertex to produce a three-dimensional visual representation of the object.

2. The method of claim 1 wherein determining the collapse order comprises the steps of:
   determining a set of collapse paths;
   selecting a collapse path from the set of collapse paths;
   computing visual distortion factors for the selected collapse path;
   responsive to the computed visual distortion factors, determining a collapse value for the selected collapse path;
   repeating selecting a collapse path, computing visual distortion factors, determining a collapse value for each collapse path;
   selecting a next vertex to be collapsed as a vertex having a collapse path causing the least visual distortion to the object;
   collapsing the next vertex to be collapsed along the corresponding collapse path; and
   repeating the above steps until a minimum resolution level is attained.

3. The method of claim 2 wherein computing visual distortion factors comprises the steps of:
   computing an area change factor for the selected collapse path;
   computing an angular deviation factor for the selected collapse path; and
   computing a local volume change factor for the selected collapse path.

4. The method of claim 3 wherein the computing an area change factor for each collapse path further comprises:
   computing an area of the object after collapsing the target vertex along the collapse path; and
   subtracting the computed area from an area of the object prior to the collapse.

5. The method of claim 3 wherein the computing a volume change factor for the selected collapse path comprises:
   computing a volume of the object after collapsing the target vertex along the collapse path;
   subtracting the computed volume from a volume of the object prior to the collapse.

6. The method of claim 5, wherein the step of computing a volume further comprises:
   selecting the target vertex to be an apex for a pyramid;
   forming a base of the pyramid from a triangle connecting three consecutive neighbor vertices to the target vertex;
   computing a volume of the pyramid;
   constructing a next pyramid from a next set of three consecutive neighbor vertices;
   computing a volume of the next pyramid;
   repeating the constructing a next pyramid and computing a volume steps for all unique three consecutive neighbor vertex sets; and
   summing the volumes of the pyramids to obtain a volume of the object.

7. The method of claim 2 further comprising the step of receiving an input from a user specifying a priority weight for a visual distortion factor, and the determining a collapse value step further comprises, responsive to the computed visual distortion factors and priority weights, determining a collapse value for the selected collapse path.

8. The method of claim 2 wherein, responsive to collapsing the next vertex to be collapsed along the corresponding collapse path, collapse paths local to the next vertex are identified and the computing visual distortion factors for the selected collapse path and the determining a collapse value for the selected collapse path steps are repeated only for the local collapse paths.

9. The method of claim 2 wherein determining a set of collapse paths further comprises:
   selecting a target vertex;
   receiving input specifying a maximum number of neighbor vertices for a target vertex;
   identifying a number of neighbor vertices, responsive to the received input;
   determining a collapse path responsive to coordinates of the target vertex and an identified neighbor vertex;
   repeating the determining step for all identified neighbor vertices;
   repeating the selecting a target vertex, identifying, determining, and repeating steps for a plurality of vertices.

10. The method of claim 2 further comprising the steps of:
    responsive to selecting a collapse path, displaying the object prior to collapsing the object along the selected path;
    collapsing the object along the specified path;
    displaying the object after being collapsed along the specified path;
    responsive to receiving an input selecting the collapse path, storing the collapse path and corresponding vertex on the collapse order list as the next vertex to be collapsed.

11. The method of claim 1, further comprising receiving an input specifying a set of minimum vertices, and the determining collapse order step further comprises determining a collapse order in which the specified set of minimum vertices are not collapsed.

12. The method of claim 1 wherein multiple resolution levels of the object exist, further comprising the steps of:

ordering the resolution levels from highest to lowest resolution;

selecting a highest resolution level for collapsing;

the determining a collapse order step comprises determining a collapse order for the highest resolution level, wherein vertices in the next lowest resolution level are not collapsed; and repeating the selecting and determining steps for each resolution level.

13. The method of claim 1 wherein the vertex coordinates are associated with vertex attributes.

14. The method of claim 2 wherein the vertices have coordinates in a texture map, further comprising the steps of:

responsive to a selected collapse path collapsing a first vertex into a second vertex to create a new vertex, assigning the texture map coordinates of the second vertex to the new vertex;

responsive to the first and second vertex being on an edge of a texture discontinuity, identifying the collapse path as a collapse path not to be used.

15. The method of claim 2 wherein the vertices have coordinates in a normal map, further comprising the steps of:

responsive to a selected collapse path collapsing a first vertex into a second vertex to create a new vertex, assigning the normal map coordinates of the second vertex to the new vertex.

16. The method of claim 2 wherein the vertices have coordinates in a color map, further comprising the steps of:

responsive to a selected collapse path collapsing a first vertex into a second vertex to create a new vertex, assigning the color map coordinates of the second vertex to the new vertex; and responsive to the first and second vertex being on an edge of a color discontinuity, identifying the collapse path as a collapse path not to be used.

17. A method for displaying an object, wherein a vertex list and a neighbor list is stored for the object, and vertices in the vertex list are identified by a collapse priority, and the neighbor list identifies the path of a collapse for the vertices, comprising the steps of:

performing a collapse of the object responsive to the vertex list and neighbor list;

storing vertex information for each collapse level, wherein the vertex information indicates which vertices exist in the object in the collapse level immediately higher and lower than the current collapse level;

receiving input requesting a collapse level for the object;

responsive to the requested collapse level requiring a higher resolution than a current collapse level, adding vertices to the vertex list for the object responsive to the vertex list and stored vertex information;

responsive to the requested collapse level requiring a lower resolution than a current collapse level, collapsing vertices in the vertex list of the object responsive to the vertex list and stored vertex information; and rendering the vertices in the vertex list to produce a three-dimensional visual representation of the object.

18. The method of claim 17 further comprising the step of:

storing extended collapse information, wherein the extended collapse information includes triangle connectivity information for the vertices.

19. A method for displaying an object, wherein a vertex list and a neighbor list is stored for the object, and vertices in the vertex list are identified by a collapse priority, and the neighbor list identifies the path of a collapse for the vertices, comprising the steps of:

performing a collapse of the object responsive to the vertex list and neighbor list;

storing vertex information for each collapse level, wherein the vertex information indicates which vertices exist in the object in the collapse level immediately higher and lower than the current collapse level;

analyzing the object to determine a collapse level;

responsive to the determined collapse level requiring higher resolution, adding vertices to the vertex list for the object responsive to the vertex list and stored vertex information;

responsive to the determined collapse level requiring a lower resolution, collapsing vertices in the vertex list for the object responsive to the vertex list and stored vertex information; and rendering the vertices in the vertex list to produce a three-dimensional visual representation of the object.

20. The method of claim 19 wherein the step of analyzing the object further comprises:

determining a velocity of the object; and determining a projected area of the object.

21. The method of claim 20 wherein the step of analyzing the object further comprises:

determining the number of polygons currently being displayed;

comparing the determined number to a predefined target number of polygons; and responsive to the number of polygons currently being displayed being less than the predefined number, adding polygons to the object.

22. The method of claim 19 wherein the step of analyzing the object further comprises:

determining a current frame rate;

comparing the current frame rate to a predefined frame rate; and responsive to the current frame being less than the predefined frame rate, collapsing vertices in the object.

23. A method for transferring data across a remote connection, in a system in which a minimal resolution of an object is stored and separate packets of information comprising data for creating higher resolutions of the object are stored, comprising the steps of:

receiving a request for a transmission of an object to be displayed;

transmitting a minimal resolution version of the object responsive to the received request;

transmitting a packet of information comprising data for creating a next higher resolution of the object;

determining whether a target resolution of the object has been met; and responsive to a target resolution of the object not being met, repeating the transmitting a packet of information comprising data for creating a next higher resolution of the object step.

* * * * *